United States Patent
Gardarin, Jr.

(10) Patent No.: US 9,841,346 B2
(45) Date of Patent: Dec. 12, 2017

(54) METHOD FOR DETERMINING THE AERODYNAMIC MOMENT OF RESISTANCE OF A WHEEL

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Benoit Gardarin, Jr., Clermont-Ferrand (FR)

(73) Assignees: Compagnie General des Etablissements Michelin, Clermont-Ferrande (FR); Michelin Recherche et Technique S.A., Grange-Paccot (CH)

( * ) Notice: Subject to any disclaimer, the term of this patent is extended or adjusted under 35 U.S.C. 154(b) by 385 days.

(21) Appl. No.: 14/410,778

(22) PCT Filed: Jun. 19, 2013

(86) PCT No.: PCT/EP2013/062696
§ 371 (c)(1),
(2) Date: Dec. 23, 2014

(87) PCT Pub. No.: WO2014/001166
PCT Pub. Date: Jan. 3, 2014

(65) Prior Publication Data
US 2015/0204755 A1  Jul. 23, 2015

(30) Foreign Application Priority Data
Jun. 29, 2012  (FR) ...................................... 12 56260

(51) Int. Cl.
*G01L 1/00* (2006.01)
*G01M 9/06* (2006.01)
(Continued)

(52) U.S. Cl.
CPC ................. *G01M 9/06* (2013.01); *G01L 3/00* (2013.01); *G01M 9/062* (2013.01); *G01M 17/013* (2013.01); *G01M 17/022* (2013.01)

(58) Field of Classification Search
CPC .. G01M 9/062; G01M 17/013; G01M 17/022; G01M 9/06; G01L 3/00; G01P 3/34
(Continued)

(56) References Cited

FOREIGN PATENT DOCUMENTS

DE          19527742 A1     1/1997
DE       102008046552 A1     3/2010
(Continued)

OTHER PUBLICATIONS

International Search Report for PCT/EP2013/062696 dated Jul. 24, 2013.
(Continued)

*Primary Examiner* — An Do
(74) *Attorney, Agent, or Firm* — Dickinson Wright, PLLC

(57) ABSTRACT

A method for determining the aerodynamic moment of resistance $M_{aero-EM}$ of a wheel arranged on an axis, by measuring the value of the mechanical power $P_m$ to be applied to the wheel in order to maintain it in rotation at a constant speed $\omega$, the said wheel being equipped with a rotational-drive means and with a device for picking off and/or recording the numerical values of the said mechanical power and those of the rotational speed. The wheel is protected by a removable cap and is subjected to a flow of air.

7 Claims, 1 Drawing Sheet

(51) Int. Cl.
*G01M 17/013* (2006.01)
*G01L 3/00* (2006.01)
*G01M 17/02* (2006.01)

(58) Field of Classification Search
USPC .............................................. 702/33, 41, 44
See application file for complete search history.

(56) References Cited

FOREIGN PATENT DOCUMENTS

| | | |
|---|---|---|
| JP | S60-189476 | 12/1985 |
| JP | H11509926 A | 8/1999 |
| JP | 2001-281109 A | 10/2001 |
| WO | 97/05465 A1 | 2/1997 |

OTHER PUBLICATIONS

Office Action, dated Apr. 25, 2016, issued in corresponding Chinese Application (Filing No. 201380034409.9, No. 2016042001477480) along with an English Language Translation.

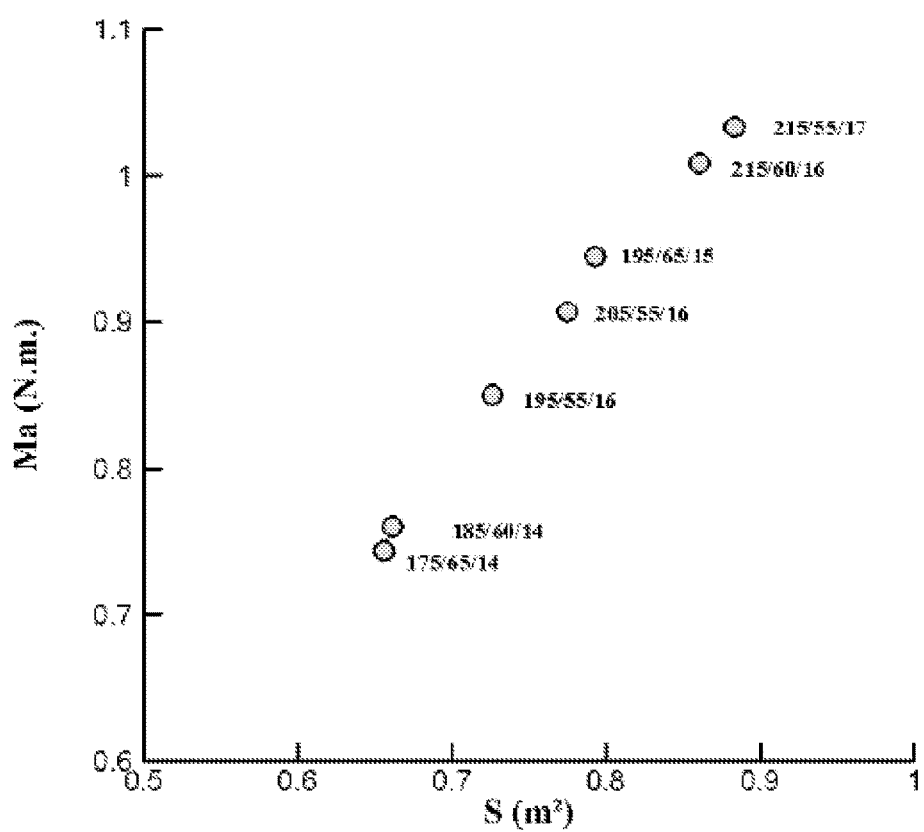

METHOD FOR DETERMINING THE AERODYNAMIC MOMENT OF RESISTANCE OF A WHEEL

This application is a 371 national phase entry of PCT/EP2013/062696, filed 19 Jun. 2013, which claims benefit of French Patent Application No. 1256260, filed 29 Jun. 2012, the entire contents of which are incorporated herein by reference for all purposes.

BACKGROUND

1. Field

The disclosure relates to a method for determining precisely the aerodynamic moment of resistance of a wheel. This method applies to land transport vehicles.

2. Description of Related Art

It will be recalled that a wheel is defined as being made up of a rim, of a wheel disc and of a tire. The tire, also referred to as the casing, is mounted on the rim to form a wheel.

Regulatory measures of fuel consumption and pollution are currently made on light cars and light utility vehicles in numerous countries. Unfortunately, these measurements do not make it possible to determine precisely the tire contribution to the resistance to forward travel.

It will be recalled that the resistance to forward travel caused by a tire comprises the following three components: the rolling resistance drag (or force), the aerodynamic drag and the aerodynamic moment of resistance (or ventilation torque).

So, in order to calculate or estimate this resistance to forward travel, practitioners take measurements, on a test bed, of the tire mounted simply on the rim, or even resort to simulations using computer software.

However, these measurements or simulations, which are performed on a test bed, do not provide values of the aerodynamic moment of resistance that are close to the values encountered under actual conditions of use of a tire because the current measurement techniques simply estimate the aerodynamic moment of resistance simply by allowing the tire mounted on a rim and arranged in an open environment free of any protection to decelerate.

Physical diameters such as the aerodynamic moment of resistance are, for the time being, the subject of mathematical estimates which despite everything remain unsatisfactory because they are estimated insufficiently.

Thus, a more precise and more realistic measurement of the aerodynamic moment of resistance would allow for a better evaluation of the resistance to forward travel caused by a wheel, and therefore of the impact this has on fuel consumption.

So, there remains a need to be able to have use of a method for determining very precisely, reliably and repeatably, the aerodynamic moment of resistance of a wheel under conditions similar to those of usual conditions of use.

SUMMARY

The subject of an embodiment of the invention is therefore a method for determining the aerodynamic moment of resistance $M_{aero-EM}$ of a wheel arranged on an axis, by measuring the value of the mechanical power $P_m$ to be applied to the wheel in order to maintain it in rotation at a constant speed $\omega$, the wheel being equipped with a rotational-drive means and with a device for picking off and/or recording the numerical values of the mechanical power and those of the rotational speed.

An embodiment of the invention is characterized in that the wheel is protected by a removable cap, in that it is constantly subjected to a flow of air, and in that the picked-off measurements of rotational speed $\omega$ and of power $P_m$ of the said wheel are input into the following mathematical formula:

$$P_m = \omega(M_{aero-EM} + M_f) \qquad (I)$$

where $P_m$ represents the mechanical power needed to keep the wheel in rotation at a constant speed, $\omega$ represents the rotational speed of the said wheel, $M_f$ represents the value of the moment of friction of the hub of the wheel, and $M_{aero-EM}$ represents the aerodynamic moment of resistance of the said wheel.

The method according to an embodiment of the invention offers the advantage of being able to be applied to any type of rim, wheel trim or tire, of being inexpensive to realize and of being simple and quick to implement.

Finally, this method makes it possible rapidly and easily to provide numerical data similar to the data encountered on a vehicle in a usual driving situation.

Protecting the wheel with a removable cap according to an embodiment of the method of the invention makes it possible to reconstruct the actual conditions in which a wheel runs, i.e. to position the wheel in a semi-protected enclosure, usually consisting of the wheel arch of a vehicle. The cap according to the invention may have any three-dimensional geometric shape as close as possible to the shapes encountered in land vehicle wheel arches.

Hitherto, the rolling resistance of a new tire mounted on a rim and pressurized has been measured using models that are standardized in a laboratory.

Examples of such models include the standard ISO/FDIS 28580 which considers various physical and mathematical parameters in order to measure or calculate them; the results obtained collectively making it possible to evaluate and/or to quantify the rolling resistance of a tire as precisely as possible.

The parameter relating to the dynamics of a wheel set of a land transport vehicle (an automobile, a van, a heavy goods vehicle), is made up of two different movements: a horizontal translational movement and a rotational movement. These two movements induce stresses connected with the flow of air around the tire because the flow of air generates a pressure field and a viscous friction field at the surface of a tire.

The aerodynamic stresses applied to such wheel sets give rise firstly to a longitudinal drag resistive force and secondly to an aerodynamic moment of resistance which opposes the rotation of the wheels.

While the longitudinal resistive drag force is easily evaluated using the present-day mathematical models that use the measurements obtained in a wind tunnel, the aerodynamic moment of resistance is not taken into consideration in wind tunnel measurements. However, this resultant, hitherto considered to be an unwanted component, does have a not-insignificant influence on the fuel consumption results connected with the resistance to forward travel of the wheel.

The method according to an embodiment of the invention, which is simple to realize, allows this aerodynamic moment of resistance to be quantified under conditions similar to those encountered by a wheel in an actual driving situation.

Specifically, the method according to an embodiment of the invention places the wheel under conditions very similar to usual driving conditions because the wheel is, on the one hand, protected by a removable cap intended to reproduce the protective effects of a vehicle wheel arch and, on the other hand, subjected to a flow of air.

Such a situation is not found in the application of standardized laboratory models because the wheel is placed in an open environment with no protection at all (because of the absence of the cap) and is not subjected to a flow of air, except for the air flow it generates through its own operation.

Thus, the stresses associated with friction and pressure giving rise to the aerodynamic moment of resistance differ in the method according to an embodiment of the invention compared with the measurement practices hitherto used.

For preference, the flow of air used according to an embodiment of the method of the invention has a main direction substantially parallel to that of the wheel.

The flow of air may have a main direction at an angle of between −40° and +40° with respect to that of the wheel. This alternative makes it possible to reproduce as exactly as possible the effects of a crosswind, headwind or tailwind in an actual driving situation.

For preference, in order to implement this method, the axis of the wheel remains fixed relative to the immobile ground. This means that there is no relative motion between the wheel and the rotational-drive means. The axis of the wheel preferably remains fixed while the drive means continues to rotate. The rotational-drive means may be a rolling road.

For preference, the flow of air has a speed identical to or different from that of the rolling road.

The wheel preferably comprises at least one means of holding the wheel suspension.

BRIEF DESCRIPTION OF DRAWING

The embodiments of the invention will now be described with the aid of the examples and of the single FIGURE which follow, which are not in any way limiting and in which:

the single FIGURE depicts the value of the aerodynamic moment of resistance as a function of the external surface of various tires.

DETAILED DESCRIPTION OF SPECIFIC EMBODIMENTS

In order to implement this method, a wheel is placed in an aerodynamic wind tunnel, and is connected to a mechanical means of inducing rotation so as to cause it to rotate constantly at a speed co. As it rotates, the wheel is not in contact with the ground. The distance between the wheel and the ground is preferably small. The wheel is also connected to a means intended to stabilize its rotation so that the measurements can be taken correctly.

The wheel is equipped with a device intended to pick off and/or record the numerical values of its rotational speed co and of the mechanical power that has to be applied in order to keep it rotating.

According to an alternative form of embodiment of the method according to the invention, the wheel may be mounted on a vehicle which will then be fixed to the ground using pylons. A rolling road drives the rotation of at least one of the wheels. A means of raising the vehicle allows the vehicle to be taken away from the floor of the wind tunnel. Fixing the vehicle to the ground makes it possible firstly to dictate the attitude of the vehicle and, secondly, to stabilize it as it is raised. The wind generator subjects the vehicle to a flow of air with a speed $V_0$ identical to the rotational speed $\omega$ of at least one wheel.

Applying mathematical formula (I) below makes it possible to obtain the value of the aerodynamic moment of resistance $M_{aero-EM}$ of the wheel using the following mathematical formula (I):

$$P_m = \omega(M_{aero-EM} + M_f) \qquad (I)$$

where
  $P_m$ represents the mechanical power needed to keep the wheel in rotation at a constant speed,
  $\omega$ represents the rotational speed of the said wheel,
  $M_f$ represents the value of the moment of friction of the hub of the wheel, and
  $M_{aero-EM}$ represents the aerodynamic moment of resistance of the said wheel.

$M_f$, which represents the value of the moment of friction of the hub of the wheel, can be calculated, for example, from the technical data supplied by the bearing manufacturer.

The rotational speed $\omega$ is obtained from the means of recording the rotational speed of the wheel.

FIG. 1 gives, for seven different references of tire of the same make and the same model but of different sizes, the calculated value of the aerodynamic moment of resistance $M_{aero-em}$ (N·m) as a function of the external surface area of each tire (m$^2$). The external surface area of the tire is defined, according to the invention, as being the surface area of the tread and that of the sidewalls.

The calculations, according to the single FIGURE, were performed with a speed of the flow of air and a rotational speed of the wheel that were identical, equal to 120 km/h. The flow of air has a main direction substantially parallel to that of the wheel.

From FIG. 1, it may be seen that the value of the aerodynamic moment of resistance increases in proportion with the external surface area of the tire.

The invention claimed is:

1. A method for determining the aerodynamic moment of resistance $M_{aero-EM}$ of a wheel arranged on an axis, by measuring the value of the mechanical power $P_m$ to be applied to the wheel in order to maintain it in rotation at a constant speed $\omega$, wherein the wheel is equipped with a rotational-drive means and with a device for picking off and/or recording the numerical values of the mechanical power and of the rotational speed, comprising:
  protecting the wheel by a removable cap,
  constantly subjecting the wheel to a flow of air,
  picking off the mechanical power $P_m$ applied to the wheel and the rotational speed $\omega$ of the wheel,
  inputting the picked-off measurements of rotational speed co and of mechanical power $P_m$ of the wheel into the following mathematical formula:

$$P_m = \omega(M_{aero-EM} + M_f) \qquad (I)$$

where
  $P_m$ represents the mechanical power needed to keep the wheel in rotation at a constant speed,
  $\omega$ represents the rotational speed of the said wheel,
  $M_f$ represents the value of the moment of friction of the hub of the wheel, and
  $M_{aero-EM}$ represents the aerodynamic moment of resistance of the said wheel.

2. The method according to claim 1, wherein the flow of air has a main direction substantially parallel to that of the wheel.

3. The method according to claim 1, wherein the flow of air has a main direction at an angle of between −40° and +40° with respect to that of the wheel.

4. The method according to claim 1, wherein the axis of the wheel remains fixed relative to the ground.

5. The method according to claim 1, wherein the flow of air has a speed identical to that of the rotational-drive means.

6. The method according to claim 1, wherein the flow of air has a speed different from that of the rotational-drive means.

7. The method according to claim 1, wherein the wheel comprises at least one means of holding the wheel suspension.

\* \* \* \* \*